(12) United States Patent
Duguid et al.

(10) Patent No.: US 9,156,972 B2
(45) Date of Patent: Oct. 13, 2015

(54) POLYPROPYLENE MELT-BLOWN SEALANT FILMS FOR RETORT PACKAGING

(75) Inventors: Grant Duguid, Constanti (ES); Rosanna deMarco, Melbourne (AU)

(73) Assignee: Dow Global Technologies LLC, Midland, MI (US)

( * ) Notice: Subject to any disclaimer, the term of this patent is extended or adjusted under 35 U.S.C. 154(b) by 838 days.

(21) Appl. No.: 12/743,426

(22) PCT Filed: Dec. 3, 2008

(86) PCT No.: PCT/US2008/085331
§ 371 (c)(1),
(2), (4) Date: May 18, 2010

(87) PCT Pub. No.: WO2009/073685
PCT Pub. Date: Jun. 11, 2009

(65) Prior Publication Data
US 2010/0255232 A1 Oct. 7, 2010

Related U.S. Application Data

(60) Provisional application No. 60/992,453, filed on Dec. 5, 2007.

(51) Int. Cl.
*B32B 1/00* (2006.01)
*C08L 23/12* (2006.01)
(Continued)

(52) U.S. Cl.
CPC .. *C08L 23/12* (2013.01); *C08J 5/18* (2013.01); *C08L 23/10* (2013.01); *C08L 23/142* (2013.01); *C08J 2323/10* (2013.01);
(Continued)

(58) Field of Classification Search
CPC .............. C08J 2323/10; C08J 2323/12; Y10T 428/1334; C08L 2023/44; C08L 2205/02; C08L 23/10
USPC ........ 428/35.2–35.9, 36.9, 36.91, 36.92, 213, 428/304, 349, 515, 516; 525/127, 192, 229, 525/333.7, 333.9, 240
See application file for complete search history.

(56) References Cited

U.S. PATENT DOCUMENTS 3,893,989 A 7/1975 Leicht et al.
4,113,802 A 9/1978 Matteoli et al.
(Continued)

FOREIGN PATENT DOCUMENTS

EP 1203655 A1 * 5/2002
WO 00/01745 A1 1/2000
(Continued)

OTHER PUBLICATIONS

Pardos, Françoise. Plastic Films: Situation and Outlook : A Rapra Market Report. Shawbury: Rapra Technology, 2004. Print.*

*Primary Examiner* — Gwendolyn Blackwell
*Assistant Examiner* — Lee Sanderson
(74) *Attorney, Agent, or Firm* — Whyte Hirschboeck Dudek S.C.

(57) ABSTRACT

A polypropylene containing resin composition suitable for use in forming films by the air quenched melt-blown film process for use as a sealing layer in a laminate for retort pouches, The resin composition includes from 80 to 98 percent by weight of a coupled impact propylene copolymer and from 2 to 20 percent by weight of a propylene-ethylene copolymer having from 2 to 10 percent by weight units derived from ethylene, wherein the composition has a melt flow rate of from 0.1 to 2.5 grams/10 minutes.

5 Claims, 4 Drawing Sheets

(51) Int. Cl.
 *C08J 5/18* (2006.01)
 *C08L 23/10* (2006.01)
 *C08L 23/14* (2006.01)
 *C08L 23/08* (2006.01)

(52) U.S. Cl.
 CPC ......... *C08J 2323/12* (2013.01); *C08L 23/0815* (2013.01); *Y10T 428/1334* (2015.01)

(56) References Cited

U.S. PATENT DOCUMENTS

| | | | |
|---|---|---|---|
| 4,769,261 A * | 9/1988 | Hazelton et al. | 428/35.3 |
| 4,769,361 A | 9/1988 | Burleigh et al. | |
| 5,504,172 A * | 4/1996 | Imuta et al. | 526/351 |
| 6,511,755 B1 * | 1/2003 | Mochizuki et al. | 428/516 |
| 6,525,157 B2 | 2/2003 | Cozewith et al. | |
| 6,663,940 B1 | 12/2003 | Osame et al. | |
| 6,776,924 B2 | 8/2004 | Walters et al. | |
| 6,960,635 B2 | 11/2005 | Stevens et al. | |
| 7,919,738 B2 | 4/2011 | Su et al. | |
| 2002/0156193 A1 * | 10/2002 | Tau et al. | 525/191 |
| 2005/0070673 A1 * | 3/2005 | Novak et al. | 525/333.9 |
| 2005/0272858 A1 * | 12/2005 | Pierini et al. | 524/543 |
| 2007/0244276 A1 * | 10/2007 | Datta et al. | 526/126 |

FOREIGN PATENT DOCUMENTS

| | | |
|---|---|---|
| WO | 01/92403 A2 | 12/2001 |
| WO | 2006/026058 A1 | 3/2006 |

* cited by examiner

POLYPROPYLENE MELT-BLOWN SEALANT FILMS FOR RETORT PACKAGING

CROSS REFERENCE TO RELATED APPLICATION

The present application claims priority to U.S. patent application Ser. No. 60/992,453, filed on Dec. 5, 2007, the entire content of which is incorporated by reference herein.

BACKGROUND

The present disclosure relates to a melt-blown polypropylene sealant film for packaging applications, and especially to such a film useful as a heat seal layer of a multi-layer film that can be formed into a flexible container or retortable flexible pouch and sealed and then heated to a temperature sufficient to pasteurize or sterilize its contents.

Retort pouches come in a variety of shapes and sizes. Two common forms are the "pillow shaped" and the "gusset" or "stand-up" pouches. These pouches are considerably lighter and lower cost structures for preserving and protecting foods, condiments, medicines and sterile solutions than other structures, and are in wide spread commercial usage. Typical pouches consist of one or two sheets of laminated material which are sealed together around the periphery, generally by heat-sealing, before or after filling. In "form and fill" packaging, the pouches are formed in line by making bottom and side seals from two films brought together in surface contact with one another, adding the material to be presented, and forming the final seal to enclose the food or other substance to be packaged, all in a continuous operation. The resulting pouch is generally a pillow shaped pouch. Alternatively, the processor may employ pre-made pouches having a single open end, which are then filled and closed or sealed after filling. This technique is better suited for gusset pouches. In a final step the pouch and contents are normally heated to pasteurize, sterilize or cook the contents, such as by use of an oven or by pressurized steam in a retort. All of such structures are referred to herein as retort pouches.

In order to be used in a retort process, the pouch should comply with a number of requirements. Numerous governmental and industry requirements determine the suitability of materials which may be used for the flexible packages, especially those that will be subjected to extreme temperature environments, or contact with foods or medicines. The physical properties of these flexible pouches: lamination bond strengths, heat seal strengths, WVTR (water vapor transmission rates), OTR (oxygen transmission rates), burst analysis, opening forces, extractable content, and other properties are exacting and carefully monitored. Typically, the pouch must remain airtight and hermetically sealed after exposure to temperatures in the range of from 120-130° C. for 30 to 80 minutes at a pressure up to 500 kPa, depending on the pouch size and the contents within the pouch. In addition, subsequent usage, such as shipping, handling and dropping must not result in rupture of the sealed pouch. For some applications pouch clarity is required as well.

One type of laminate that is currently available for use in forming flexible retort pouches comprises multiple layers. One layer is designed to provide an outer protective surface to the pouch by preventing punctures or pin hole development and desirably is adapted to receive printing or graphics without migration of foreign substances such as inks or solvents to the contents of the pouch. Two or more of the foregoing polymeric layers may be provided where enhanced strength is desired. Another layer (a barrier layer) may be provided to prevent or limit water vapor or oxygen transmission to or from the pouch contents. In certain constructions, the tie layer(s) joining the various layers of the construction may also serve as barrier layers. For example, an adhesive material comprising clay nanoparticles may serve as a barrier layer in addition to or in place of a specifically designated barrier layer. The final layer is generally a sealant layer which ultimately serves to join the film (if folded upon itself) or multiple films (if the sealant layers thereof are placed in surface contact with one another) into the desired pouch through application of localized heat and pressure, such as with a heating bar or roller.

Suitable materials for forming the various layers of the foregoing laminates include polyethylene terephthalate (PET), polyamides, and polyolefins, such as polypropylene for the outer layer(s), metal foils or metal deposition layers, polyvinylidene chloride, or ethylene/vinyl alcohol (EVOH) polymers, for the barrier layer(s), and polyolefins or modified polyolefins, such as, ethylene/(meth)acrylic acid copolymers, maleic anhydride grafted polyolefins, ionomers, and blends of the foregoing with one another or with an elastomer for the sealant layer. The sealant layer may include a crystalline polypropylene (CPP), such as isotactic polypropylene, isotactic propylene/ethylene copolymers, or blends thereof with an elastomer, due to the low extractables content and good adhesive properties of such resins.

The various layers of the multilayer films may be held together by adhesives, including solvent based adhesives and, more preferably, solventless adhesives such as a curable epoxy resin or a two-component urethane adhesive. Alternatively, many constructions employ coextruded films in which the various components, optionally including tie layers or adhesive layers, are extruded from a die or a multi-block die, optionally onto a substrate comprising one or more of the layers of the resulting film, and cooled to form the desired multi-layer film. For ease of fabrication, improved performance, an ability to alternate between various materials of construction, as well as reduced component cost, or where a metal film is employed as one layer, it is highly desirable to employ preformed films for the respective polymeric or non-polymeric layers and to construct the desired multi-layer film by adhering the various film layers to one another using an adhesive.

Suitable films, especially sealant films, for the foregoing use may be prepared by casting films having the desired physical properties. Particularly with respect to currently available polypropylene based sealant resins, the foregoing technique is necessitated because the resin employed is selected based on its adhesive properties in order to achieve a broad sealing window, and strong initial- and post-retort-adhesion properties. As a result, such resins generally are deficient in melt strength and can only be turned into films through use of cast film techniques. This is due to the fact that such resins generally will not support film formation by standard air quenched melt-blown techniques due to an inability to form a stable bubble from the molten polymer. Because the cast film process is generally a low volume/high cost process, the resulting films typically are more expensive to produce than air quenched melt-blown films (or as they are often referred to "air-quenched blown films"), thereby increasing the cost of the resulting sealant films, multi-layer films constructions, and retort pouches prepared therefrom.

It has been proposed to employ a high melt strength polypropylene for preparing air-quenched blown films and multi-layer film structures. Disadvantageously, although the resulting films possess improved toughness and appearance (especially improved hammer skin resistance) compared to a cast crystalline polypropylene films, they are generally lacking in adhesion properties, especially post-retort seal strength.

It would be desirable if there were provided a polypropylene based adhesive resin composition that is capable of use in preparing films by the air-quenched melt blown-film forming technique and which possesses suitable adhesion properties for use as a sealant layer in multi-layer retort pouch packaging applications.

It would further be desirable if there were provided a sealant film comprising a polypropylene resin that is prepared by air quenched melt blown-film forming techniques which possesses suitable adhesion properties for use in retort pouch packaging applications. Preferably, the sealant film will also contribute both stiffness and toughness (as measured by Dart impact strength) to the retort pouch.

It would also be desirable if there were provided a multi-layer laminate for use in retort pouch packaging applications, comprising as an outer layer thereof a sealant film comprising a polypropylene resin that is prepared by an air quenched blown-film forming techniques.

Further, it would be desirable for the sealant film comprising the polypropylene resin to exhibit sufficiently low extractables (both xylene soluble fraction and n-hexane soluble extractables) to be useful for environments where the sealant film may be in contact with food and other consumables, such as water.

Finally, it would be desirable if there were provided a retort pouch for use in packaging applications, said pouch being formed from one or more multi-layer laminates comprising a sealant film as an outer layer thereof, said sealant film comprising a polypropylene resin and having been prepared by an air quenched melt blown-film forming techniques.

SUMMARY

The present disclosure sets forth a resin composition containing polypropylene and capable of use in preparing films by the air quenched blown-film forming technique which possesses suitable adhesion properties for use as a sealant layer in multi-layer retort pouch packaging applications. The resin composition includes: (A) from 80 to 98 percent by weight of a coupled impact propylene copolymer which includes (1) from 77 to 98 percent by weight of a polypropylene homopolymer; and (2) from 2 to 23 percent by weight of an ethylene-alpha olefin interpolymer; and (B) from 2 to 20 percent by weight of a propylene-ethylene copolymer having from 2 to 10 percent by weight units derived from ethylene. The resin composition has a melt flow rate of from 0.1 to 2.5 grams/10 minutes or from 0.3 to 0.9 grams/10 minutes as measured in accordance with ASTM D1238 Condition L (2.16 kg, 230° C.).

In an embodiment, the coupled impact propylene copolymer includes from 3 to 20 percent by weight of an ethylene-propylene rubber. The ethylene-propylene rubber has from 30 to 70 percent by weight units derived from ethylene and from 30 to 70 percent by weight units derived from propylene.

In another embodiment, there is provided a film comprising a polypropylene containing resin composition as described above, that is prepared by air quenched blown-film forming techniques which possesses suitable adhesion properties for use as a sealant layer in multi-layer retort pouch packaging applications.

In yet another embodiment, there is provided a multi-layer laminate for use in retort pouch packaging applications, comprising as an outer layer thereof a sealant film comprising a resin composition as described above, that is prepared by air quenched blown-film forming techniques.

In a further embodiment, there is provided a retort pouch for use in packaging applications, said pouch being formed from one or more multi-layer laminates comprising a sealant film as an outer layer thereof, said sealant film comprising the resin composition as described above, and having been prepared by air quenched melt-blown, film forming techniques.

In an embodiment, another retort pouch is provided. The retort pouch includes a first blown film and an opposing second blown film. Each film includes a first layer that may be an outer layer, a second layer that may be a core layer, and third layer that may be an inner layer. The first layer is composed of a propylene-ethylene copolymer. The second layer is composed of a coupled impact propylene copolymer. The third layer is composed of a propylene-ethylene copolymer. The propylene-ethylene copolymer of the first and third layers may be the same or different. A heat seal extends along a common periphery of the first sheet and the second sheet. The pouch is wrinkle-free post retort. In an embodiment, the first layer is coextruded to the second layer and the second layer is coextruded to the third layer. In other words, the first layer and the third layer are coextruded to the second layer.

In an embodiment, the second layer is a blend of the coupled impact propylene copolymer and the propylene-ethylene copolymer. The second layer may include about 70% by weight of the coupled impact propylene copolymer and about 30% by weight of the propylene-ethylene copolymer, based on the total weight of the second layer.

In an embodiment, the coupled impact propylene copolymer utilized is formed by the reaction of a coupling agent with the impact propylene copolymer. The coupled impact propylene copolymer is formed by the reaction of an impact propylene copolymer with a coupling agent, such as bis(sulfonyl azide). In order to meet food contact requirements of the various food packaging regulatory bodies, the propylene-ethylene copolymer may include from 2 to 7 percent by weight units derived from ethylene, or from 4 to 6 percent by weight units derived from ethylene.

In an embodiment, the resin composition used to make the film sealant layer possesses sufficient melt strength to be able to be formed into films by the air quenched melt-blown film forming process yet retain sufficient adhesive properties to form good seals under heat seal formation conditions and provide good toughness (as exhibited by Dart impact strength) and additional stiffness to the films and retort packages. Such sealant resins are desired for use in forming retort pouches for use in retort packaging applications. The coupled impact propylene copolymer may exhibit less than 2.6 weight percent n-hexane extractables fraction at 50° C. and less than 30 weight percent xylene extractable fractions at 25° C.

The film capable for use as a sealant layer (film sealant layer) exhibits a tensile modulus of at least 80,000 p.s.i. when tested in accordance with ASTM D882-02. Also, a blown film capable of use as a sealant layer exhibits a value of dart impact of at least 40 g/mil when measured according to ASTM D1709 Method A. The film sealant layer may exhibit less than 2.6 weight percent n-hexane extractables fraction at 50° C. and less than 30 weight percent xylene extractable fraction at 25° C., as measured in accordance with 21 CFR 177.1.520(c) 3.2a.

By meeting the requirements for modulus described above and the values for dart impact described above, the film sealant layer will provide excellent stiffness and toughness to the overall film structure, in addition to excellent sealant properties. This contrasts with most sealant films, which typically reduce the stiffness and/or toughness of the overall film structure and hence the retort pouch.

DETAILED DESCRIPTION

Figure 1:
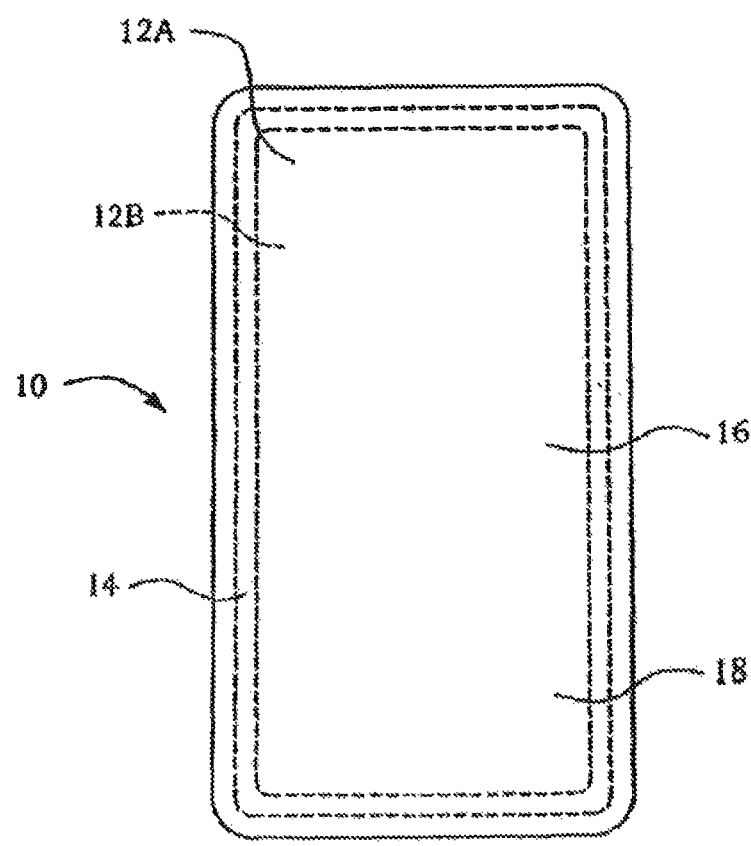
FIG. 1 is a plan view of a pillow retortable pouch of the present disclosure.

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions and general knowledge in the art. Unless stated to the contrary, customary in the art or implicit from the description, all parts and percentages are expressed on a weight basis.

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as disclosed herein, in reference to density, weight percent of component, tan delta, molecular weights and other properties.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting" of excludes any component, step or procedure not specifically delineated or listed. The term "or", unless stated otherwise, refers to the listed members individually as well as in any combination.

The term "polymer", includes both homopolymers, that is, homogeneous polymers prepared from a single polymer forming, reactive compound or monomer, and copolymers (interchangeably referred to herein as interpolymers), meaning polymers prepared by reaction of at least two polymer forming, reactive compounds.

As used herein with respect to a chemical compound, unless specifically indicated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen.

Coupled Impact Propylene Copolymer

The present disclosure provides a resin composition which includes a coupled impact propylene copolymer and a propylene-ethylene copolymer. The coupled impact propylene copolymer is formed by the reaction of a coupling agent (as further described below) with an impact propylene copolymer.

The term "impact propylene copolymer" is used herein to refer to heterophasic propylene copolymers where polypropylene is the continuous phase and an elastomeric phase is dispersed therein. The elastomeric phase may also contain crystalline regions, and may be considered part of the elastomeric phase. Impact propylene copolymers result from an in-reactor process rather than physical blending. Typically, impact propylene copolymers are formed in a dual or multistage process, which optionally involves a single reactor with at least two process stages taking place therein, or optionally multiple reactors. Impact propylene copolymers are commercially available and are well known within the skill in the art, for instance, as described by E. P. Moore, Jr. in Polypropylene Handbook, Hanser Publishers, 1996, page 220-221 and U.S. Pat. Nos. 3,893,989 and 4,113,802, which are incorporated by reference herein in their entirety. The elastomeric phase may be an ethylene-based copolymer rubber, such as ethylene propylene, ethylene 1-butene and/or ethylene propylene 1-butene rubbers. In an embodiment the elastomeric phase is an ethylene-alpha olefin interpolymer.

The continuous phase of the impact propylene copolymer may be a polypropylene homopolymer or a propylene and alpha-olefin copolymer or terpolymer. In an embodiment, the continuous phase of the impact propylene copolymer is a homopolymer propylene polymer (homopolypropylene) and the elastomeric phase is comprised of a copolymer or terpolymer containing from 30 to 70 weight percent monomer units derived from ethylene. The weight percent of units derived from ethylene is based on the total weight of the elastomeric phase. All individual values and subranges from 30-70 weight percent monomer units derived from ethylene are included and disclosed herein. For example, the copolymer or terpolymer may contain 35 to 65 weight percent monomer units derived from ethylene.

The impact propylene copolymer contains from 3 weight percent to 11 weight percent monomer units derived from ethylene, based on the total weight of the impact propylene copolymer. All individual values and subranges from 3-11 weight percent are included and disclosed herein. For example, the weight percent of units derived from ethylene may be from a lower limit of 3 percent, 5 percent, or 6 percent to an upper limit of 9 percent, 10 percent, or 11 percent, in an embodiment, the impact propylene copolymer has a melt flow rate from 1.0 g/10 min to 5.0 g/10 min, or from 1.1 g/10 min to 1.3 g/10 min (or any value or subrange therebetween), or 1.2 g/10 min. The melt flow rate is determined in accordance with ASTM D-1238 procedure (Condition L). The impact propylene copolymer may have a content of units derived from ethylene from 5% by weight to 10% by weight, or from 7% by weight to 9% by weight (or any value or subrange therebetween), or 8.5% by weight (based on the total weight of the impact propylene copolymer). In a further embodiment, the impact propylene copolymer is a medium impact propylene copolymer under the designation C 104-01, available from the Dow Chemical Company, Midland, Mich. The properties for C 104-01 are set forth in Table 1 below.

TABLE 1

C 104-01 Properties

| Physical Properties | Metric | English | Test Method |
|---|---|---|---|
| Density | 0.900 g/cc | 0.0325 lb/in$^3$ | ASTM D792 |
| Melt Flow | 1.20 g/10 min | 1.20 g/10 min | 2.16 kg; 230° C.; ASTM D1238 |
| | Metric | English | Comments |
| Mechanical Properties | | | |
| Tensile Strength, Yield | 26.9 MPa | 3900 psi | molded and tested in accordance with ASTM D 4101; ASTM D638 |
| Elongation at Yield | 9.00% | 9.00% | molded and tested in accordance with ASTM D 4101; ASTM D638 |
| Flexural Modulus | 1.24 GPa | 180 ksi | 1% Secant; molded and tested in accordance with ASTM D 4101; ASTM D790A |
| Izod Impact, Notched | 1.87 J/cm | 3.50 ft-lb/in | molded and tested in accordance with ASTM D 4101; ASTM D256A |
| Thermal Properties | | | |
| Deflection Temperature at 0.46 MPa (66 psi) | 87.8° C. | 190° F. | unannealed: molded and tested in accordance with ASTM D 4101; ASTM D648 |

In an embodiment, the amount of the elastomeric phase present in the impact propylene copolymer is suitable to permit contact between the resin composition and food and/or other comestibles. In other words, the impact propylene copolymer has a xylene soluble fraction and/or an n-hexane extractable fraction that is equal to or less than the limits established by governmental agencies such as the U.S. Food and Drug Administration, European Union food regulatory agencies, and/or the Japan Hygienic Olefin and Styrene Plastics Association. In a further embodiment, the resin composition is in conformance with one or more of the following U.S. Food and Drug Administration Regulations: 21 CFR 177.1520(c).

In an embodiment, the continuous phase is a propylene ethylene copolymer containing 2-7 weight percent, —CH$_2$CH$_2$— units derived from ethylene monomer based on the total weight of the continuous phase. All individual values and subranges from 2-7 weight percent are included and disclosed herein. In an embodiment, the units derived from ethylene content of the continuous phase is less than 5%. In a further embodiment, the coupled impact propylene copolymer has an acceptably low amount of xylene soluble fraction and/or n-hexane extractable levels (in accordance with governmental food regulatory agencies) and is suitable for application involving comestible contact, regardless of the continuous phase composition.

The impact propylene copolymer is reacted with a coupling agent to form the coupled impact propylene copolymer. As used herein, a "coupling agent" is a chemical compound that contains at least two reactive groups that are each capable of forming a carbene or nitrene group that are capable of inserting into the carbon hydrogen bonds of aliphatic, CH, CH$_2$, or CH$_3$ groups, and also aromatic CH groups, of a polymer chain. The reactive groups can couple polymer chains together. It may be necessary to activate a coupling agent with heat, sonic energy, radiation, or other chemical activating energy, for the coupling agent to be effective for coupling polymer chains. Nonlimiting examples of chemical compounds that contain a reactive group capable of forming a carbene group include diazo alkanes, geminally-substituted methylene groups, and metallocarbenes. Examples of chemical compounds that contain reactive groups capable of forming nitrene groups, include, but are not limited to, phosphazene azides, sulfonyl azides, formyl azides, and azides.

The resin composition may comprise 200 to 1000 parts by weight of the coupling agent per one million parts of the impact propylene copolymer. All individual values and subranges from 200 to 1000 parts per million are included herein. The presence of the coupling agent in the impact propylene copolymer may be from a lower limit of 200 ppm, or 400 ppm to an upper limit of 600 ppm, or 800 ppm, or 1,000 ppm. Exemplary coupling agents include, but are not limited to, poly(sulfonyl azide), and a bis(sulfonyl azide). Nonlimiting examples of poly(sulfonyl azide) include 1,5-pentane bis(sulfonyl azide), 1,8-octane bis(sulfonyl azide), 1,10-decane bis (sulfonyl azide), 1,10-octadecane bis(sulfonyl azide), 1-octyl-2,4,6-benzene tris(sulfonyl azide), 4,4'-diphenyl ether bis (sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from 2 to 5 sulfonyl azide groups per molecule, and mixtures thereof. Nonlimiting examples of the bis(sulfonyl azide) include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof. In an embodiment, the coupling agent may, for example, be 4,4'-diphenyl oxide bis-sulfonyl azide.

Sulfonyl azides are commercially available or are prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used.

Sulfonyl azides and other azides can be shock sensitive. It may be necessary to phlegmatize the azides or to otherwise protect the azides from reaction during the manufacture and processing of the azide, or the shipping and handling of the azide. As used herein, "phlegmatizing" refers to methods for reducing the shock sensitivity of a chemical or chemical species by mixing or combining the reactive chemical with an inert or less reactive chemical. For example, an antioxidant and a coupling agent may be blended together to form a molecular melt, and that the formation of this molecular melt can phlegmatize the coupling agent.

In an embodiment, the coupling agent is a component of a molecular melt. As used herein, a "molecular melt" is a blend of a coupling agent and an antioxidant, optionally also containing other polymer additives. The coupling agent and the antioxidant form a complex where the Raman spectra relating to the groups forming the nitrene groups are shifted compared to the Raman spectra exhibited by the groups forming the nitrene groups of the coupling agent alone.

A coupling reaction occurs between the impact propylene copolymer and the coupling agent to form the coupled impact propylene copolymer. As used herein, "coupling" or "coupled" refers to modifying the rheology of a polymer by reacting the polymer with a suitable coupling agent. Thus, "a coupled impact propylene copolymer" is characterized by an increase in melt strength of at least about 25% and a decrease in melt flow rate, compared to the impact propylene copolymer before coupling. In an embodiment, the coupled impact propylene copolymer utilized in the resin composition has a melt strength of at least from 8 cN to 30 cN (measured at 190° C.). All individual values and subranges from 8 cN to 30 cN are included and disclosed herein. For example, the coupled impact propylene copolymer may have a melt strength lower limit of 8 cN, or 12 cN and a melt strength upper limit of 25 cN, or 30 cN. The melt flow rate (MFR) of the coupled impact propylene copolymer utilized in the resin composition is from 0.1 to 2.7 g/10 min according to ASTM D-1238, condition L (2.16 kg, 230° C.). All individual values and subranges from 0.1 g/10 min to 2.7 g/10 min are included and disclosed herein. For example, the MFR may have a lower limit of 0.1 g/10 min, or 0.2 g/10 min, or 0.3 g/10 min and an upper limit of 0.8 g/10 min, 1.0 g/10 min, 1.5 g/10 min, or 2.7 g/10 min. The density of the coupled impact propylene copolymer is between 0.895 to 0.910 g/cc. All individual values and subranges from 0.895 g/cc to 0.910 g/cc are included and disclosed herein. A nonlimiting example of a suitable coupled impact propylene copolymer is INSPIRE™ D114 available from The Dow Chemical Company, Midland, Mich., INSPIRE™ D114 has a density of 0.90 g/cc, a melt flow rate of 0.5 g/10 min, and a tensile modulus from 80,000 psi to 145,000 psi or about 130,000 psi as measured in accordance with ASTM D882-02. In an embodiment, the coupled impact copolymer has an n-hexane extractable fraction of less than 2.6% by weight measured at 50° C. in accordance with 21 CFR 177.1520(c)3.2a.

Propylene-Ethylene Copolymer

In order to improve the adhesive properties of the sealant resin, the resin composition includes from 1 to 20 percent of a propylene-ethylene copolymer, based on the total weight of the resin composition. All individual values and subranges from 1 weight percent to 20 weight percent are included and disclosed herein. For example, the propylene-ethylene copolymer may have a weight percent lower limit of 1 percent, or 2 percent, or 3.5 percent, and a weight percent upper limit of 10 weight percent, or 20 weight percent. The propylene-ethylene copolymer may contain from 2 to 10 weight percent of units derived from ethylene (or any value or subrange therebetween) or from 3 to 8 weight percent units derived from ethylene, or from 3.5 to 7.0 weight percent units derived from ethylene. The weight percent is based on the total weight of the propylene-ethylene copolymer.

In an embodiment, the propylene/ethylene copolymer is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

In an embodiment, the propylene/ethylene copolymer has a melt flow rate in the range of from 0.1 to 15 g/10 minutes, measured in accordance with ASTM 1)-1238 (at 230° C./2.16 Kg). All individual values and subranges from 0.1 to 15 g/10 minutes are included herein and disclosed herein; for example, the melt flow rate can be from a lower limit of 0.1 g/10 minutes, 0.2 g/10 minutes, or 0.5 g/10 minutes to an upper limit of 15 g/10 minutes, 10 g/10 minutes, 8 g/10 minutes, or 5 g/10 minutes. For example, the propylene/ethylene copolymer may have a melt flow rate in the range of 0.1 to 10 g/10 minutes; or in the alternative, the propylene/ethylene copolymer may have a melt flow rate in the range of 0.2 to 10 g/10 minutes.

In an embodiment, the propylene/ethylene copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 joules/gram) or 7 percent by weight (a heat of fusion of less than 11 joules/gram). For example, the propylene/ethylene copolymer may have a crystallinity in the range of from at least 1 percent by weight (a heat of fusion of at least 2 Joules/gram) to 24 percent by weight (a heat of fusion of less than 40 Joules/gram), or in the alternative, the propylene/ethylene copolymer may have a crystallinity in the range of from at least 1 percent by weight (a heat of fusion of at least 2 joules/gram) to 15 percent by weight (a heat of fusion of less than 24.8 Joules/gram); or in the alternative, the propylene/ethylene copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/ethylene copolymer may have a crystallinity in the range of from at least 1 percent by weight (a heat of fusion of at least 2 Joules/gram) to 5 percent by weight (a heat of fusion of less than 8.3 Joules/gram).

The crystallinity is measured via Differential Scanning Calorimetry (DSC) analysis. DSC is a common technique that can be used to examine the melting and crystallization of semi-crystalline polymers. General principles of DSC measurements and applications of DSC to study semi-crystalline polymers are described in standard texts (e.g., E. A. Turi, ed., Thermal Characterization of Polymeric Materials, Academic Press, 1981). In an embodiment, the propylene/ethylene copolymer may be characterized by a DSC curve with a $T_{me}$ that remains essentially the same and a $T_{max}$ that decreases as the amount of unsaturated comonomer in the copolymer is increased. $T_{me}$ is the temperature at which the melting ends. $T_{max}$ is the peak melting temperature.

Differential Scanning Calorimetry (DSC) analysis is determined using a model Q1000 DSC from TA Instruments, Inc. Calibration of the DSC is done as follows. First, a baseline is obtained by running the DSC from −90° C. to 290° C., without any sample in the aluminum DSC pan. Then 7 milligrams of a fresh indium sample is analyzed by heating the sample to 180'C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C., from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of ° C./min. The onset of melting is determined and checked to be within 0.5° C. from 0° C.

The polypropylene samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and the heated at a high rate of about 100° C./min to a temperature of about 30° C. above the melt temperature. The sample is kept at this temperature for about 3 minutes. Then the sample is cooled at a rate of 10° C./min to −40° C., and kept isothermally at that temperature for 3 minutes. Consequently the sample is heated at a rate of 10° C./min until complete melting. The resulting enthalpy curves are analyzed for peak melt temperature, onset and peak crystallization temperatures, heat of fusion and heat of crystallization, $T_{me}$, and any other DSC analyses of interest.

In an embodiment, the propylene/ethylene copolymer comprises units derived from propylene and polymeric units derived from ethylene and one or more alpha-olefin comonomers. Exemplary comonomers utilized to manufacture the propylene/ethylene copolymer are ethylene and $C_4$ to $C_{10}$ alpha-olefins; for example, $C_4$, $C_6$ and $C_8$ alpha-olefins.

In an embodiment, the propylene/ethylene copolymer comprises from 1 to 40 percent by weight of ethylene and one or more comonomer(s). All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/ethylene copolymer comprises from 1 to 35 percent by weight of ethylene and one or more alpha-olefin comonomers; or in the alternative, the propylene/ethylene copolymer comprises from 1 to 30 percent by weight of ethylene and one or more alpha-olefin comonomers; or in the alternative, the propylene/ethylene copolymer comprises from 3 to 27 percent by weight ethylene and one or more alpha-olefin comonomers; or in the alternative, the propylene/ethylene copolymer comprises from 3 to 20 percent by weight of ethylene and one or more alpha-olefin comonomers; or in the alternative, the propylene/ethylene copolymer comprises from 3 to 15 percent by weight of ethylene and one or more alpha-olefin comonomers.

In an embodiment, the propylene-ethylene copolymer has a molecular weight distribution (Mw/Mn) of 3.5 or less; in the alternative 3.0 or less; or in another alternative from 1.8 to 3.0. The propylene-ethylene copolymer may also have a $^{13}C$ NMR spectrum containing peaks corresponding to a regio-error at about 14.6 ppm and about 15.7 ppm, the peaks of about equal intensity. The ethylene-propylene copolymer may be further characterized in that the propylene sequences are substantially isotactic, that is, they have an isotactic triad (mm) measured by $^{13}C$ NMR of greater than 0.85.

Such propylene/ethylene copolymers are further described in detail in the U.S. Pat. Nos. 6,960,635 and 6,525,157, incorporated herein by reference. Such propylene/ethylene copolymers are commercially available from The Dow Chemical Company, under the tradename VERSIFY™, or from ExxonMobil Chemical Company, under the tradename VISTAMAXX™.

In an embodiment, the propylene/ethylene copolymer is further characterized as comprising (A) between 60 and less than 100, or between 80 and 99, or between 85 and 99, weight percent units derived from propylene, and (B) between greater than zero and 40, or between 1 and 20, or between 4 and 16, or between 4 and 15, weight percent units derived from at least one of ethylene and/or a $C_{4-10}$ α-olefin; and containing an average of at least 0.001, or an average of at least 0.005, or an average of at least 0.01, long chain branches/1000 total carbons. The maximum number of long chain branches in the propylene/ethylene copolymer is not critical to the definition, but typically it does not exceed 3 long chain branches/1000 total carbons. The term long chain branch, as used herein, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Provisional Patent Application No. 60/988,999 filed on Nov. 19, 2007, the entire content of which is incorporated by reference herein.

The propylene-ethylene copolymers may also exhibit a relatively broad melting range in the DSC heating curve. In an embodiment, the propylene-ethylene copolymer begins to melt at 50° C. and continues to melt until at least 128° C. This broad melting behavior will not only result in lower seal initiation temperatures for ease in sealing the films and pouches, but will also result in films and pouches that have enhanced seal stability at temperatures typically encountered in retort applications, such as from 120° C. to 130° C. The melt flow rate for the propylene-ethylene copolymer is from 0.1 to 5 g/10 min measured in accordance with ASTM D-1238 condition L (2.16 kg, 230° C.). All individual values and subranges from 0.1 g/10 min to 5 g/10 min are included and disclosed herein. For example, the melt flow rate may have a lower limit of 0.1 g/10 min or 0.2 g/10 min, or 0.5 g/10 min and an upper limit of 3 g/10 min, or 4 g/10 min, or 5 g/10 min.

In an embodiment, the propylene-ethylene copolymer contains 5% by weight of units derived from ethylene. The propylene-ethylene copolymer has a density of 0.887 g/cc and a melt flow rate of 2.0 g/10 min (ASTM D-1238).

Resin Composition

The resulting resin composition for use as the sealant layer has a MFR from 0.1 to 2.5 g/10 min (or any individual value or subrange therein), or from 0.1 to 1.2 g/10 min, or from 0.3 to 0.9 g/10 min. The density of the resin composition is from 0.885 to 0.905 g/cc (or any individual value or subrange therein), or about 0.898 g/cc. The resin composition has a melt strength from 8 cN to 30 cN (or any individual value or subrange therein), or from 12 cN to 25 cN. The resin composition also has a drawability from 15 mm/sec to 50 mm/sec (or any individual value or subrange therein), or from 25 mm/sec to 35 mm/sec at 190° C. The resin composition exhibits desirable processability during the film-shaping step.

"Melt Strength" and "Melt Drawability" are measured by pulling strands of the molten polymer or blend at constant acceleration until breakage occurs. The experimental set-up consists of a capillary rheometer and a Rheotens™ take-up device, or a Rheotens™ melt tension instrument. The molten strand is drawn uniaxially to a set of accelerating nips located 100 mm below the die. The force required to uniaxially extend the strands is recorded as a function of the take-up velocity of the nip rolls. In the case of polymer melts exhibiting draw resonance (indicated by the onset of a periodic oscillation of increasing amplitude in the measured force profile), the maximum force and wheel velocity before the onset of draw resonance are taken as the melt strength and drawability, respectively. In the absence of draw resonance, the maximum force attained during the test is defined as the melt strength and the velocity at which breakage occurs is defined as the melt drawability. The following conditions are employed: Mass flow rate: 1.35 gram/min. Temperature: 190° C. Equilibration Time at 190° C.: 10 minutes. Die: 20:1 with entrance angle of approximately 45 degrees. Capillary length: 41.9 mm. Capillary diameter: 2.1 mm. Piston diameter: 9.54 mm. Piston velocity: 0.423 mm/s. Shear rate: 33.0 $s^{-1}$. Drawdown distance (die exit to take-up wheels): 100 mm. Cooling conditions: ambient air. Acceleration: 2.4 $mm/s^2$.

In an embodiment, the resin composition has an n-hexane extractable fraction of less than 2.6% by weight measured at 50° C. in accordance with 21 CFR 177.1520(c)3.2a.

Known additives may be incorporated into the resin composition so long as the objects of the disclosure are not compromised. Nonlimiting examples of such additives include nucleating agents, antioxidants, acid scavengers, heat stabilizers, light stabilizers, ultraviolet light absorbers, lubricants, antistatic agents, pigments, dyes, dispersing agents, inhibitors, neutralizing agents, foaming agents, plasticizers, flowability improvers, anti-blocking agents, slip additives, and weld strength improvers.

The above-mentioned additives may be employed in any combination and may each be contained in the respective polymer compositions in amounts of 0.0001 to 10 percent (or any individual value or subrange therein) or in an amount from 0.001 to 1.0 percent.

The resin composition may comprise two or more embodiments as disclosed herein.

The resin composition may be formed into a film. In an embodiment, the film is a blown film. As used herein, "a blown film" is a resin composition that is melt extruded through an annular circular die to form a tube. The tube is expanded by air (i.e., two or three times its initial diameter). Cool air is simultaneously applied to the tube (internally and/or externally) to chill the expanded tube to a solid state. The degree of expansion and the chill rate determine nonlimiting film properties such as tensile strength, impact strength, polymer orientation, crystallinity, clarity, gloss, and thickness. The expanded tube is removed from the expansion zone by any suitable collection equipment.

The film tube may then be shaped. In an embodiment, the film tube is collapsed within an inverted V-shaped frame of rollers and is nipped at the end of the frame to trap the air within the bubble. The nip rolls also draw the film away from the die. The draw rate is controlled to balance the physical properties with the transverse properties achieved by the blow draw ratio. The tube may be wound as such onto one or more rolls. Alternatively, the film tube may be slit and wound as a single-film layer. The film tube may also be directly processed into pouches. If desired, the resin composition may be coextruded with one or more compatible polymers to form multilayer films.

The film may comprise two or more embodiments as disclosed herein.

Referring to the drawings, and initially to FIG. 1, one form of pillow or flat retortable pouch according to the disclosure is shown and indicated generally by the reference numeral 10. As used herein, "a retort pouch" or "a retortable pouch" is a flexible package that can remain airtight and sealed after exposure to temperatures from 120° C.-135° C. and pressure up to 500 kPa for 30-80 minutes. The pillow pouch 10 includes two sheets 12A and 12B of laminated material, joined and sealed together about their respective peripheries by a heat seal 14. The heat seal 14 may extend along the entire common periphery of sheets 12A, 12B. Alternatively, the heat seal 14 may extend along a portion of the common periphery of sheets 12A, 12B. A storage space 16 is defined by the area between the two sheets 12A, 12B and within the heat seal 14. The storage space 16 is sealed off from the surrounding environment and contains the contents 18, of the pouch, for example, foodstuffs. While the package is described as having two sheets 12A, 12B, it should be readily apparent to those skilled in the art that a single sheet could be used. The sheet could be folded upon itself to form the two layers. The three unconnected edges would then be heat sealed after the contents are placed between the folded-over layers.

Figure 2:
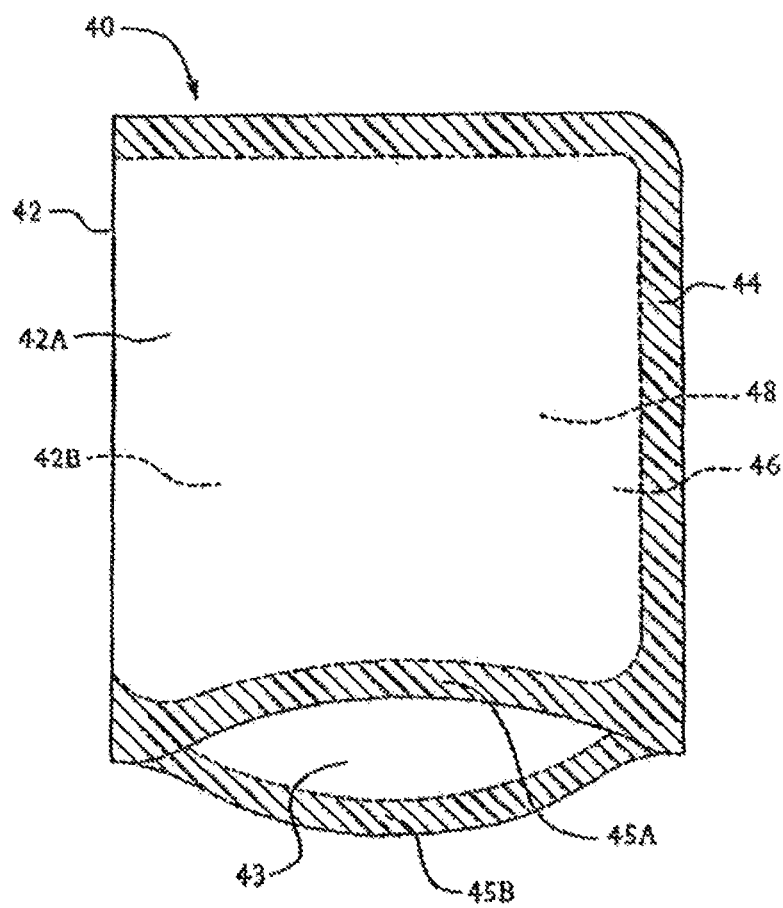
FIG. 2 is a perspective view of a stand-up retortable pouch of the present disclosure.

Referring now to FIG. 2, one form of gusset or stand-up retortable pouch is indicated generally by the reference numeral 40. The gusset pouch 40 includes two sheets of laminated material 42 and 43. One sheet 42 is folded to form the front and back sheets 42A and 42B of the pouch. The sheets are joined and sealed together about their respective edges by a heat seal 44 around the sides and top, and heat seals 45A, 45B in the bottom gusset. A storage space 46 is defined by the area between the three sheets 42A, 42B, 43 and within the heat seals 44, 45A and 45B. The storage space is sealed off from the surrounding environment and contains the contents 48 of the pouch. The sheets 42A, 42B and 43 can be formed in any suitable shape desired for containing the pouch contents.

In an embodiment, two webs of laminated material are fed into a pouch forming machine. A main web forms the sheet 42, and is folded in half along one side of the pouch to form the front sheet 42A and the back sheet 42B, which are aligned one on top of the other. The free edges of the sheets 42A and 42B are heat sealed together by the heat seal 44 along the other side of the pouch. The second web is fed into the side of the machine to form the bottom gusset sheet 43, and is heat sealed to the front and back sheets 42A and 42B to form an open-topped pouch. The pouch can now be stored for later filling, or can go directly on-line into the filling machinery. After the contents have been placed within the pouch, the top edges of the front and back sheets 42A and 42B are sealed together by a final heat seal 44.

While the package is described as having two sheets 42 and 43, it is possible that three sheets could be used, with the front 42A and rear 42B being formed from separate webs of material, heat-sealed together along both sides. It will also be apparent that a single sheet could be utilized. The single sheet could be folded upon itself to form the three sheets. The middle of the single sheet would form the gusset 43, and the ends would meet at the top of the pouch. The unconnected side and top edges would then be heat sealed, at least one of them being sealed only after the contents are placed between the folded-over layers.

Figure 3:
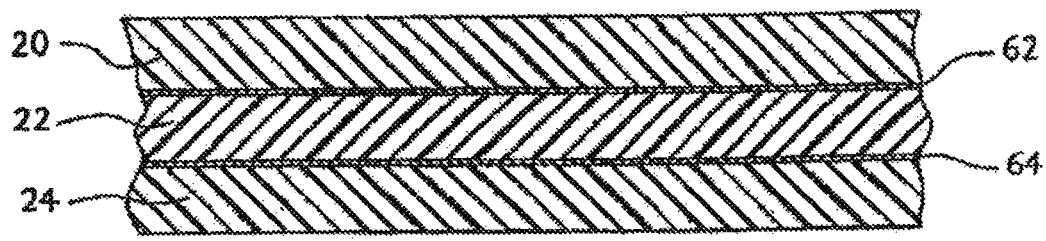
FIG. 3 is a cross-sectional view through one sheet of a three-layer retortable pouch shown in FIG. 1.

The sheets 12A, 12B of the pillow retortable pouch 10 and the sheets 42A, 42B, 43 of the stand-up pouch 40 can be manufactured from a 3-layer laminated structure as shown in FIG. 3. The outer layer 20 (or outermost layer 20), which is furthest away from the package contents 18 or 48, is made from polyesters, polyamides, and polyolefins such as polypropylene. In an embodiment, the outer layer 20 is a polyester such as polyethylene terephthalate. In a further embodiment, outer layer 20 is polyethylene terephthalate film, about 5 to 20 μm in thickness (or any individual value or subrange therein).

Immediately adjacent to the outer layer 20 is a barrier layer 22. The barrier layer 22 may have a thickness of 5 to 25 μm (or any individual value or subrange therein). Suitable materials of construction for barrier layer 22 include nylon, polyvinylidene chloride, EVOH, polyethylene, polypropylene, aluminum foil, or a metallized polymer film such as metallized nylon or metallized polyester sheet.

A sealant layer 24 is immediately adjacent to the barrier layer 22. The sealant layer 24 (or the innermost layer, or the pouch content contact layer) is composed of the resin composition. In an embodiment, the sealant layer 24 has a thickness from about 25 to about 110 μm. The sealant layer 24 may be a blown film or a coextruded blown film.

All layers in the retortable package are bonded together by an adhesive, preferably a solventless adhesive such as an epoxy or a polyurethane adhesive. Polyurethane adhesives based on two components, a polyol and an aliphatic isocyanate may be used. Both of these components can be based on chemicals that are low enough in molecular weight to be mixed and applied to the films without using solvents for dilution and application and are suitable for food contact.

In an embodiment, the outer layer 20 and the barrier layer 22 are bonded together by an adhesive layer 62, such as LIOFOL™ UR 3690 with UR6090 hardener manufactured and sold by Henkel Adhesives, mixed in weights of about 50:1, optionally with a diluent to provide a solids content of from 25 to 50 percent, applied at a coating weight of about 3-5 g/m². The adhesive may be applied to outer layer 20, and barrier layer 22 is then contacted with the adhesive layer, such as by use of a nip roll. The sealant layer 24 is next bonded to the barrier layer 22 by use of an additional adhesive layer 64, which may be LIOFOL™ UR 3640 mixed with UR6800 hardener, applied at a coating weight also of 3-5 g/m². The adhesive layer 64 is applied to the surface of the barrier layer 22, which is then laminated to sealant layer 24. The laminate is then cured for a period of up to 10 days, optionally by exposure to elevated temperature. All three layers may be joined in a single sequential operation, or alternatively, an initial laminated film (outer layer plus barrier layer) may be prepared and cured prior to lamination to the sealant layer. In an embodiment, the outer layer 20 is polyethylene terephthalate and has a thickness of 12 microns, the barrier layer 22 is aluminum foil and has a thickness of 12 microns, and the sealant layer 24 is the resin composition and has a thickness of 80 microns.

Figure 4:
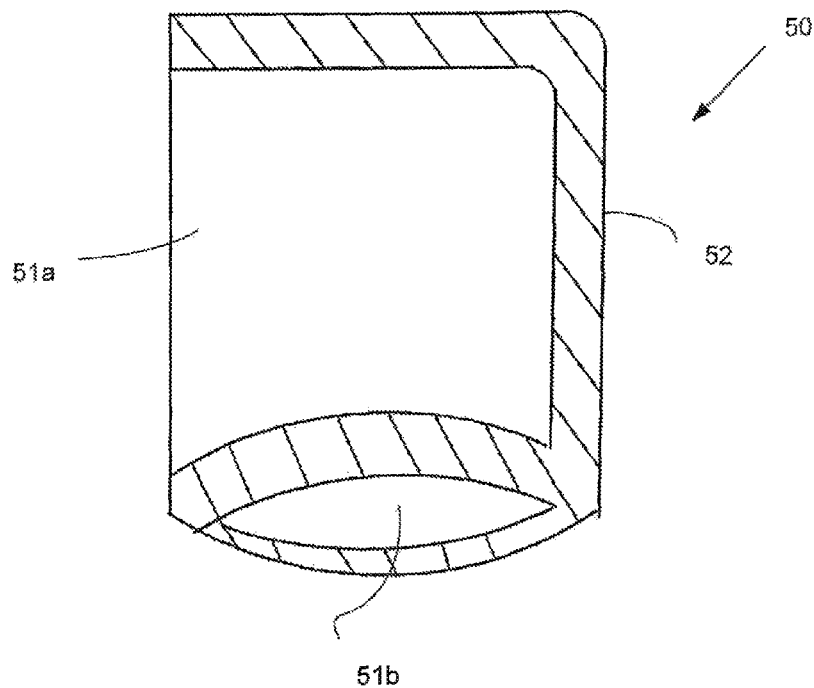
FIG. 4 is a perspective view of a retort pouch of the present disclosure.
Figure 5:
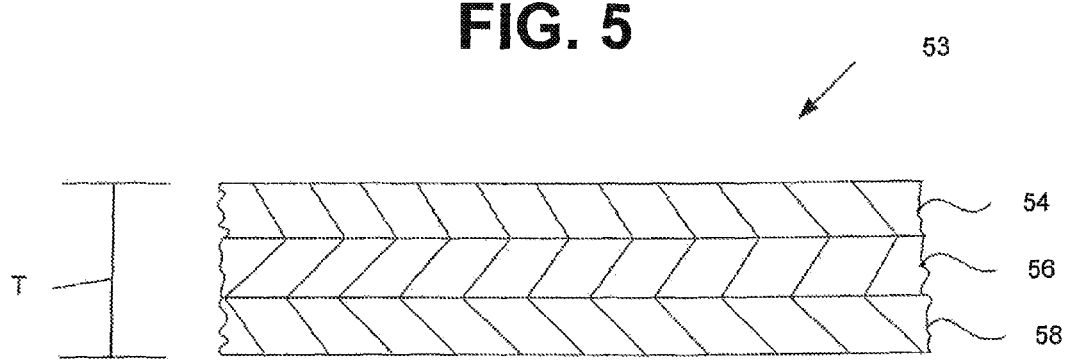
FIG. 5 is a cross-sectional view of a multiple layer film of the present disclosure.

In an embodiment, FIG. 4 shows a retort pouch 50 formed from a first blown film 51a and an opposing second blown film 51b with a heat seal 52 extending along a common periphery. The heat seal 52 may extend along the entire common periphery or along a portion of the common periphery. Each blown film 51a, 51b has a multiple layer structure 53 as shown in FIG. 5. The multiple layer structure 53 includes a first layer (or an outer layer or outermost layer) 54, a second layer (or a core layer) 56, and a third layer (or an inner layer or innermost layer) 58. The third layer 58 is the food contact layer. The retort pouch 50 is wrinkle-free, or substantially wrinkle-free, post retort.

In an embodiment, the first layer 54 and the third layer 58 are each composed of a propylene-ethylene copolymer. The propylene-ethylene copolymer may be any propylene-ethylene copolymer disclosed herein. The composition of the first layer 54 and the composition of the third layer 58 may be the same or different. The second layer 56 may be composed of the coupled impact propylene copolymer.

The thickness of first, second, and third layers 54, 56, and 58 may be the same or different. In an embodiment, the thickness of the first layer 54 is the same as the thickness of the third layer 58. In a further embodiment, the first and third layers 54, 58 have the same thickness and the thickness of the second layer 56 is at least three times greater than the thickness of the first and third layers 54, 58. For example, the second layer 56 may be 60% of the total thickness T of the multiple layer structure 53 with the first layer 54 and the third layer 58 each being 20% of the total thickness T.

In an embodiment, the second layer 56 is a blend of the coupled impact propylene copolymer and the propylene-ethylene copolymer. For example, the second layer 56 may contain about 70% by weight of the coupled impact propylene copolymer and about 30% by weight of the propylene-ethylene copolymer.

In an embodiment, the first layer 54 is coextruded to the second layer 56. The third layer 58 is coextruded to the second layer 56. The first layer 54 and the third layer 58 are each in direct and intimate contact with the second layer 56. In other words, no intervening layers exist between the first layer 54 and the second layer 56. Similarly, no intervening layers exist between the third layer 58 and the second layer 56.

In an embodiment, the blown film 51a and/or the blown film 51b having the multiple layer structure 53 may be the sealant layer in pouches 10, 40. In other words, the multiple layer structure 53 may serve as a multiple layer sealant layer in laminated retort pouches.

The retortable pouches 10, 40, and 50 described above are designed to withstand a maximum applied temperature in the range of 120 to 135° C. (or any individual value or subrange therein) for 30 to 90 minutes without significant degradation. In an embodiment, the post-retort seal strength of three ply laminates (of the form PET/adhesive/foil/adhesive/PP sealant) is at least 40 N/15 mm, more desirably at least 45 N/15 mm for pouch 10 and/or pouch 40. It is understood that the use of alternative substrates or layers (e.g., polyamide film) in the laminate structure can act to significantly increase the tensile strength of the laminate and afford a significant positive impact on the seal strength. Generally, it is also desirable to be able to attain these seal strengths using heater bar temperatures of 240° C. or less, and contact times of 1 second or less.

Applicants have surprisingly discovered that the presence of the propylene-ethylene copolymer in the resin composition advantageously reduces the seal temperature and the seal dwell time required to obtain the desired post-retort seal strength without affecting the film appearance. The resin composition, when formed into a film/seal layer for a retort pouch, experiences little or no post-retort wrinkling as shown by the roughness values $R_a$ in Table 4 below. In other words, the resin composition when formed into a film is substantially wrinkle-free, or wrinkle-free, post-retort. At a sealing bar temperature of 200° C. and a sealing pressure of 275 kPa, a pouch with a seal layer composed of the resin composition has a seal strength greater than 40 N/15 mm.

The presence of the propylene-ethylene copolymer in the seal layer composed of the resin composition also advantageously improves the refrigerated drop strength for the pouch. The present resin composition, films, and pouches made therefrom provide an alternative to cast polypropylene in retort pouch applications.

The retort pouch may comprise two or more embodiments as disclosed herein.

It is understood that the present disclosure is operable in the absence of any component which has not been specifically disclosed and may be combined with any other suitable component, step or process in an overall system or design. The following examples are provided in order to further illustrate the invention and are not to be construed as limiting.

EXAMPLES

Example 1

A coupled impact propylene copolymer is manufactured by reacting C 104-01 with a coupling agent. C 104-01 is a medium impact propylene copolymer, available from The Dow Chemical Company. C 104-01 has a density of 0.900 g/cc, a melt flow rate of 1.2 g/10 min, from about 3 to about 12 weight percent units derived from ethylene and a tensile modulus of 167,000 p.s.i. (according to ISO 527-2). The coupling agent is diphenyloxide bissulfonate azide ("DPO-BSA"). The DPO-BSA is a molecular melt with 23.8 percent weight DPO-BSA as set forth in Table 2 below.

TABLE 2

DPO/BSA (diphenyloxide bissulfonate azide): $(N_3SO_2)_2C_6H_6$
Molecular Melt: 23.8 wt-% DPO/BSA
Sulfur content in Molecular Melt: 0.238 * 0.16.84 = 0.0400

|   | # atoms | mw | | wt-% in DPO/BSA |
|---|---|---|---|---|
| N | 6 | 14 | 84 | 22.11% |
| S | 2 | 32 | 64 | 16.84% |
| O | 5 | 16 | 80 | 21.05% |
| C | 12 | 12 | 144 | 37.89% |
| H | 8 | 1 | 8 | 2.11% |
|   |   |   | 380 | 100.00% |

C 104-01 has a polypropylene homopolymer continuous phase with an ethylene-propylene copolymer elastomeric phase dispersed therein. The ethylene-propylene copolymer includes 50 weight percent monomer units derived from ethylene based on the total weight of the ethylene-propylene copolymer. C 104-01 has 8.5% by weight of units derived from ethylene (based on the total weight of the impact copolymer) and 17% by weight of units derived from ethylene based on the total weight of the ethylene-propylene copolymer. C 104-01 is reacted with 225 ppm of DPO-BSA in a pelletizing extruder which melt mixes the powder C 104-01 polymer particles and introduces heat to cause the DPO-BSA to react with the copolymer to create a coupled impact propylene copolymer. The temperatures within the extruder typically range from 170° C. to 280° C. The resulting coupled impact propylene copolymer (CIPC-1) has a melt flow rate of 0.5 g/10 min and exhibits a tensile modulus of at least 80,000 psi, or from 80,000 psi to 145,000 psi (according to ASTM D882-02) and a dart impact strength of at least 40 g/mil (according to ASTM D1709 Method A). The DPO-BSA is provided in the form of a molecular melt, which is substantially similar to the molecular melt described in Example 12 of U.S. Pat. No. 6,776,924, which is hereby incorporated by reference with regard to the teachings relating to azide containing formulations and the methods for reacting such azide containing formulations with base polymers to produce coupled impact copolymers.

A resin composition is formed by dryblending a CIPC-1 with 0.0 percent (Comparative A*), 5.0 percent (Resin 1) and 10.0 percent (Resin 2) of VERSIFY™ 2000 Plastomer. VERSIFY™ 2000 Plastomer is a propylene/ethylene copolymer having a MFR of 2.0 g/10 min, and a density of 0.887 g/cc, prepared substantially according to the teachings of U.S. Pat. No. 6,960,635. The resins are first tumble blended and fed into a conventional blown film line, such as a 3 layer Reifenhauser coextrusion film line fitted with two 60 mm and one 80 mm single screw extruders. The feed rate is adjusted such that 80 percent of maximum torque is achieved.

The extruders are run at 80 rpm. The inlet, barrel and outlet temperature profile across the three extruders is 220° C. and the die temperatures are set at 230° C. The polymer melt exits the extruder at a temperature of approximately 230-240° C., passes through a ring die and is expanded with compressed air into a vertically disposed bubble. The resulting bubble is stable for all resins and easily adjusted in diameter so that the blow up ratio (the ratio of bubble circumference to die circumference) is approximately 2:1, and the primary take off nips are adjusted to afford a film 80 μm in thickness. After cooling, the bubble is slit and the film collected on a take-up reel.

Multi-layer laminates are prepared by adhering polyethylene terephthalate (PET) films (12 μm thick) to aluminum foil substrates (12 μm thick) using LIOFOL UR™ 3640 adhesive and LIOFOL UR™ 6800 hardener (available from Henkel Adhesives) in a mixing ratio of 50:1, a solids content of diluted adhesive of 35 percent and a coating weight on the PET film of 3.5 g/m². To the aluminum foil surface the polypropylene sealant film is adhered using LIOFOL UR™ 3690 adhesive and LIOFOL UR™ 6090 hardener (available from Henkel Adhesives) in a mixing ratio of 50:1, a solids content of diluted adhesive of 35 percent and a coating weight on the PET film of 4.0 g/m². The laminates are stored under ambient room conditions for 24 hours, then cured at 50° C. for 7 days.

Retort pouches are prepared from the foregoing multi-layer films for enclosing various foods and food simulants. The laminates are converted into three side seal pouches using a Waterline pouch making machine fitted with constant heat sealing bars, to produce three side seal pouches (16.0× 15.5 cm) using side seal temperatures of 250° C. and one second dwell time. Three seals are made to form a small bag, a measured quantity of the food or food simulant is added, and the final seal is made to form a retort pouch. The final (top) seal is made in a position which ensured minimum headspace inside the bags.

The food or food simulants used are: water (300 ml); water and white vinegar and canola oil mixed in a 1:1:1 ratio (300 ml); and 200 ml meat curry (produced as a raw mixture of ground beef onion, canola oil, water and curry paste). The filled pouches are heated in a FMC Retort Chamber (single basket) at 130° C. for 30 minutes. After retorting, the filled pouches are tested for general appearance, water and oxygen transmission rates and seal strength.

All of the laminates demonstrate excellent surface appearance showing insignificant dimpling, reduced hammerskin (surface roughness), and good resistance to creasing and wave formation, with few or no retort tray marks and wrinkles.

Water or food simulant filled pouches are emptied, cleaned and dried and the side seals are tested for seal strength. Results are contained in Table 3.

TABLE 3

| Food Simulant | None | Water | Water/oil/vinegar | Meat Curry |
|---|---|---|---|---|
| Pouch Volume (ml) | None | 100 | 300 | 200 |
| Retort Temperature (° C.) | None | 130 | 130 | 130 |
| Retort Cooking Time** (min) | None | 30 | 30 | 30 |
| Sealant Composition | Pre-Retort Seal Strength (N/15 mm) | Post Retort Seal Strength (N/15 mm) | Post Retort Seal Strength (N/15 mm) | Post Retort Seal Strength (N/15 mm) |
| Resin 1 | 45.2 | 41.7 | 39.5 | 41.5 |
| Resin 2 | 54.7 | 44.5 | 45.3 | 42.5 |
| Comparative A* | 48.7 | 39.8 | 38.9 | 39.1 |

*Comparative, not an example of the invention
**Retort cooking time excludes ramp up and cool down time Roughness data of the water filled pouches is measured using a Cotec-Altisurf 500 profilometer, using a profilometry test method which does not involve direct contact of a stylus with the laminate surface. The test method and equipment are described as follows.

Pouches are made using Resin 1, Resin 2, comparative A* and two commercially available cast PP retort sealant films Comparative B* and Comparative C*, sourced from Japan. Pouches are filled with 300 ml tap water, sealed and retorted at 130° C. for 30 minutes. The pouches are emptied of their contents, carefully dried and tested for surface roughness, $R_a$. Line profiles are measured in the X direction for a distance of 30 mm, sampling every 51 μm. Five lines are measured per sample at 2 mm spacing in the Y direction. The numerical average roughness ($R_a$) from this testing is shown in Table 4. Gaussian filters of 0.8 mm and 2.5 mm are applied to the data to remove noise. The roughness data, $R_a$, for each sample is shown using both 0.8 mm and 2.5 mm filters.

TABLE 4

| Sealant Composition | Average $R_a$ on roughness profile Gaussian (0.8 mm) filter applied | Std Deviation | Average $R_a$ on roughness profile Gaussian (2.5 mm) filter applied | Std Deviation |
|---|---|---|---|---|
| Resin 1 | 0.190 | 0.020 | 0.450 | 0.100 |
| Resin 2 | 0.210 | 0.040 | 0.420 | 0.070 |
| Comparative A* | 0.180 | 0.010 | 0.480 | 0.070 |
| Comparative B* | 0.280 | 0.020 | 0.580 | 0.070 |
| Comparative C* | 0.360 | 0.060 | 0.710 | 0.100 |

The data shows that the pouches based on Resin 1 and Resin 2 had lower levels of roughness compared with the commercially available sealants Comparative B* and Comparative C*. This roughness data tested on post 130° C. retort pouches is consistent with the visual comparison of the pouches.

The foregoing results generally indicate improved post-retort seal strengths for the films based on elastomer containing, rheologically modified polypropylene resin blends while retaining good film forming and post retort pouch appearance properties.

Example 2

A sealant layer having a multiple layer structure is provided. Sealant films are produced via coextrusion incorporating VERSIFY™ 2000 Plastomer and CIPC-1 resins into multiple layer coextruded blown film structures. The multiple layer structures may have the following forms: A/B/A, B/B/A, or B/A/A. When the structure includes multiple A layers, the thickness of the A layers may be the same or different. Similarly, when the structure includes multiple B layers, the thickness of the B layers may be the same or different. The composition for layer A and the composition for layer B is provided below.

Layer A VERSIFY™ 2000 Plastomer
Layer B CIPC-1 or
70% CIPC-1+30% VERSIFY™ 2000 Plastomer Two examples of A/B/A coextruded blown film structures are shown in Table 5. Both examples provide high retort temperature resistance, and excellent blown film processing via the use of a high melt strength, high temperature resistant core layer of CIPC-1. The sealant layer of VERSIFY™ 2000 Plastomer affords low temperature sealing properties. The use of coextrusion enables the production of a film having an excellent balance of temperature resistance during the retort process.

TABLE 5

| Coextruded Example | A layer 20% of film thickness | B layer 60% of film thickness | A layer 2% of film thickness |
|---|---|---|---|
| 10 | VERSIFY ™ 2000 Plastomer | CIPC-1 | VERSIFY ™ 2000 Plastomer |
| 11 | VERSIFY ™ 2000 Plastomer | 70% CIPC-1 + 30% VERSIFY ™ 2000 Plastomer | VERSIFY ™ 2000 Plastomer |

The VERSIFY™ 2000 Plastomer and CIPC-1 resins are fed into separate extruders, and/or blended together in one or more layers and processed into a film via a conventional three layer blown film line, such as a 3 layer Reifenhauser coextrusion film line fitted with two 60 mm and one 80 mm single screw extruders. The feed rate is adjusted to modify each extruder output and achieve the desired layer ratio, in this instance 20%:60%:20% thickness ratio for A/B/A layer structure. The inlet, barrel and outlet temperature profile across the three extruders is 220° C. and the die temperatures are set at 230° C. The polymer melt exits the extruder at a temperature of approximately 230-240° C., passes through a ring die and is expanded with compressed air into a vertically disposed bubble. The resulting bubble is stable for all resins and easily adjusted in diameter so that the blow up ratio (the ratio of bubble circumference to die circumference) is approximately 2:1, and the primary take off nips are adjusted to afford a film 80 μm in thickness. After cooling, the bubble is slit and the film collected on a take-up reel.

The A/B/A coextruded blown film is symmetrical and provides a balance of modulus for each of the layers, and usually results in a flat film, which is readily laminated in downstream processes. Asymmetric film structures, such as B/B/A or B/A/A, can also be used as the sealant layer if desired.

Retort pouches with a multiple layer sealant layer as the sole layer are prepared using the coextruded blown films previously described, without lamination to other substrates. The films are cut to sheets having dimensions 200 mm×150 mm in the machine direction and heat sealed using an IDM Hot Tack Tester fitted with 250 mm×5 mm flat, constant heat sealing bars set at the temperatures shown in Table 5. Three seals are made to form a small bag, 300 ml of water is poured into the hag, and the final seal is made to form a pouch. The top seal is made in a position which ensures minimum headspace. Filled pouches are cooked in a FMC Retort Chamber (single basket) at 122° C. or 130° C. for a cooking time of 30 minutes. After retorting, the filled pouches are emptied, dried and tested post retort seal strength, and the results are reported in Table 6.

TABLE 6

| Sealing bar temperature (° C.) | Dwell time (s) | Sealing pressure (kPa) | Example 10 pre-retort seal strength (N/15 mm) | Example 10 post 122° C. retort seal strength (N/15 mm) | Example 11 pre-retort seal strength (N/15 mm) | Example 11 post 122° C. retort seal strength (N/15 mm) | Example 11 post 130° C. retort seal strength (N/15 mm) |
|---|---|---|---|---|---|---|---|
| 120 | 0.2 | 275 | na | na | na | na | na |
| 120 | 0.3 | 275 | 24.5 | 25.0 | 26.2 | 25.0 | 28.4 |
| 120 | 0.4 | 275 | 23.5 | 26.5 | 25.2 | 26.5 | 29.4 |
| 120 | 0.5 | 275 | 25.6 | 25.2 | 26.7 | 25.2 | 26.5 |
| 130 | 0.2 | 275 | na | na | na | na | na |
| 130 | 0.3 | 275 | 25.6 | 25.6 | 27.0 | 25.6 | 27.1 |
| 130 | 0.4 | 275 | 25.1 | 27.4 | 26.9 | 27.4 | 27.9 |
| 130 | 0.5 | 275 | 25.9 | 27.0 | 26.8 | 27.0 | 28.4 |
| 140 | 0.2 | 275 | 25.5 | 27.7 | 21.4 | 27.7 | 27.6 |
| 140 | 0.3 | 275 | 23.5 | 28.0 | 24.0 | 28.0 | 29.0 |
| 140 | 0.4 | 275 | 23.7 | 28.0 | 24.6 | 28.0 | 29.5 |
| 140 | 0.5 | 275 | 24.8 | 28.4 | 24.7 | 28.4 | 27.3 |
| 150 | 0.2 | 275 | 24.0 | 23.5 | 26.1 | 23.5 | 26.8 |
| 150 | 0.3 | 275 | 27.2 | 26.6 | 25.0 | 26.6 | 27.9 |
| 150 | 0.4 | 275 | 27.4 | 30.0 | 24.1 | 30.0 | 25.2 |
| 150 | 0.5 | 275 | 26.9 | 27.6 | 24.3 | 27.6 | 25.5 | n/a - Samples were not analyzed as the seals were incomplete, and the films were unable to form a pouch under the sealing conditions.

The films of Examples 10 and 11 withstand the retort process even in the unlaminated state, with excellent post retort pouch appearance, without significant deformation or wrinkling. In other words, the films of Examples 10 and 11 form pouches that are wrinkle-free and deformation-free post retort. This illustrates that the presence of CIPC-1 resin in the core layer acts to maintain the temperature resistance of the pouches throughout the cooking process. The seal strength data demonstrates that the films of Examples 10 and 11 afford excellent low temperature sealing performance, as well as post retort seal strength retention.

For purposes of United States patent practice, the contents of any patent, patent application or publication referenced herein are hereby incorporated by reference in their entirety herein, especially with respect to the disclosure of structures, synthetic techniques and general knowledge in the art. It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A retort pouch comprising:
   a first sheet and an opposing second sheet, each sheet comprising
     an outer layer comprising a polyester,
     an innermost seal layer consisting of a single layer film comprising a polymeric blend of
   (A) from 90 to 98 percent by weight of a coupled impact propylene copolymer comprising from 3 to 11 percent by weight of units derived from ethylene based on the total weight of the impact propylene copolymer and comprising a propylene homopolymer continuous phase and an elastomeric phase comprising an ethylene-propylene copolymer, and
   (B) from 2 to 10 percent by weight of a propylene-ethylene copolymer having from 3.5 to 7.0 percent by weight of units derived from ethylene, the blend having a melt flow rate from 0.1 to 2.5 grams/10 minutes as measured in accordance with ASTM D1238 condition L;
   a barrier layer located between the outer layer and the seal layer, the barrier layer selected from the group consisting of nylon, polyvinyl chloride, ethylene vinyl alcohol, polyethylene, polypropylene, aluminum foil, metallized nylon, and metallized polyester; and
   a heat seal along a common periphery of the first sheet and the second sheet;
   wherein the innermost seal layer is bonded directly to the barrier layer by an adhesive layer, and
   wherein the retort pouch is wrinkle-free post retort and has an average Ra value less than 0.480 (Gausian, 2.5 mm filter), wherein the retort pouch is retorted at 130° C. for 30 minutes.

2. The retort pouch of claim 1 comprising a first adhesive layer located between the outer layer and the barrier layer, and a second adhesive layer located between the barrier layer and the seal layer.

3. The retort pouch of claim 1 wherein the heat seal is formed at a sealing temperature of 200° C. and a sealing pressure of 275 kPa and the heat seal has a seal strength greater than 40 N/15 mm.

4. The retort pouch of claim 1 wherein the outer layer is polyethylene terephthalate and the barrier layer is aluminum foil.

5. The retort pouch of claim 1 wherein the seal layer is a blown film.

\* \* \* \* \*